Patented Feb. 10, 1942

2,272,809

UNITED STATES PATENT OFFICE 2,272,809

DERIVATIVES OF THE NUCLEAR SATURATED AND UNSATURATED PREGNANE SERIES AND PROCESS FOR MAKING SAME

Karl Miescher, Riehen, and Albert Wettstein, Basel, Switzerland, assignors, by mesne assignments to Ciba Pharmaceutical Products, Incorporated, Summit, N. J., a corporation of New Jersey No Drawing. Application November 10, 1939, Serial No. 303,911. In Switzerland November 15, 1938

6 Claims. (Cl. 260—397.4)

It has been found that derivatives of the nuclear saturated and unsaturated pregnane series are obtained by saturating the semicyclic double bond of $\alpha,\beta$-unsaturated 21-aldehydes of this series, in a manner itself known, with free or substituted hydroxyl groups or with oxygen, and if required, treating the compounds thus obtained with reesterifying, hydrolyzing, reducing and/or esterifying or etherifying agents.

The parent substances may be of any steric configuration, substituted as desired and saturated or unsaturated in the nucleus. Isolated double bonds present in the nucleus, as well as sensitive substituents, such as aldehyde or hydroxyl groups, are protected intermediarily in a usual manner, for example, by saturation with halogens or hydrogen halides, by acetalation or by esterification or etherification.

For the saturation of the semicyclic double bond of the parent substances according to the present process there may be used, for example, hydrogen peroxide and its derivatives, such as organic and inorganic peracids or peroxides, for example perbenzoic acid, perphthalic acid or peracetic acid, metal oxides like osmium tetroxide or vanadium pentoxide, permanganates, lead tetraacylates, silver salts in the presence of a halogen or previously formed halogen complexes of silver salts, free or esterified hypohalogenous acids, hydrogen halides, sulphuric acids, as well as free halogens or pseudo-halogens. If required, the reaction may be carried out in the presence of catalysts. If required reesterifying agents, like carboxylic acid salts, hydrolyzing agents, like alkaline or acid agents, or reducing agents may subsequently be allowed to react on the products containing ethyleneoxide or substituted hydroxyl groups. If required compounds with free hydroxyl groups are finally treated with esterifying or etherifying agents, introducing any organic or inorganic acid radicals or alcoholic or phenolic residues. In this way, 21-aldehydes of the saturated and unsaturated pregnane series are obtained which contain an ethylene oxide group in the 17, 20-position or, in the 17- and/or 20-position, free and/or substituted i. e. esterified or etherified hydroxyl groups.

Among others therefore especially may be prepared by the new process the $\Delta^4$-17.20-epoxy-pregnene-3-one-21-als and the $\Delta^4$-pregnene-3-one-21-als containing in 17- and/or 20-position free, esterified or etherified hydroxyl groups, also analogous 5.6-unsaturated 3-hydroxy-compounds etc.

The final products are used in therapeutics or serve as intermediate products in the preparation of compounds possessing therapeutic value.

Example 1

1.6 parts of $\Delta^{4:17}$-pregnadiene-3-one-21-al are dissolved in 15 parts of absolute methyl alcohol and heated under reflux with 0.8 part of ortho formic acid ester and 0.02 part of ammonium nitrate. The reaction mixture is completely freed from solvent in vacuo. The resulting acetal is taken up in 250 parts of ether, 1.3 parts of osmium tetroxide are added and the solution is allowed to stand for some time at room temperature. Then the whole is evaporated to dryness, the residue boiled for 2 hours with 70 parts of a 15% sodium sulphite solution in 20% alcohol. The solution is removed from the sodium-osmium sulphite formed by suction, and is concentrated in vacuo, after which the oily residue is taken up in chloroform and washed with water. The chloroform solution is freed from solvent and the residue is heated for splitting up the acetal with 2N-hydrochloric acid in 70% alcohol. After subsequent cooling and neutralizing most of the alcohol is removed in vacuo at 35° C. and the concentrated solution extracted with ether, the ethereal extract then being washed with water and dried. After removal of the solvent, the $\Delta^4$-pregnene-17:20-diol-3-one-21-al remaining behind is purified by crystallizing from methanol. This product can be converted by esterifying or etherifying agents in usual manner into its 20-monoderivatives or, by more energetic treatment into its 17.20-di-derivatives and its enol-derivatives, for example the acylates like acetates and propionates, the methyl and ethyl ethers etc.

The 21-acetal of $\Delta^{4:17}$-pregnadiene-3-one-21-al used above may also be prepared by acetalation of $\Delta^{5:17}$-acetoxy-pregnadiene-21-al, alkaline saponification of the ester group and oxidation of the 3-hydroxyl group, for example, by means of a ketone in presence of a metal alcoholate.

In an analogous manner $\Delta^5$-pregnene-3.17.20-triol-21-als and their esters and ethers are obtained.

The 3.20-disubstituted derivatives of the said 3.17.20-triol may be transformed for example by the action of halogenating agents into the 17-halogenated derivatives and then by reducing agents into the $\Delta^5$-pregnene-3-ol-21-als containing in 20-position an esterified or etherified hydroxyl group. In an analogous manner other saturated and unsaturated pregnane-21-als containing in 20-position an esterified or an etherified hydroxyl may be prepared, for example the esters and ethers of Δ⁴-pregnene-3-one-20-ol-21-als.

*Example 2*

A solution containing 1.8 parts of Δ¹⁷-3-acetoxy-pregnene-21-al dissolved in 8 parts of absolute alcohol is heated together with 0.8 part of orthoformic acid ester and 0.01 part of ammonium chloride for 30 minutes under reflux. The main portion of the alcohol then is removed by vacuum distillation, water is added and the whole is extracted with ether. The dried residue obtained by evaporating the ether extract is taken up in 75 parts of chloroform, the solution is cooled to 0° C., mixed with one of 0.76 part of perbenzoic acid in chloroform and, after keeping at 0° C. for 12 hours, is allowed to stand some further time at room temperature. When the reaction is complete, washing is carried out with 2N caustic soda solution and water, the chloroform removed in vacuo, and the residue taken up in a 1% solution of potassium carbonate in 90% methanol. This solution is then heated 30 minutes for saponification of the acetate, after which aqueous hydrochloric acid is added and heating is renewed. After cooling, water is added copiously and the whole is extracted with ether. From the ether extract the 17:20-epoxy-pregnane-3-ole-21-al is obtained and purified by recrystallization from aqueous alcohol.

Should the parent substance contain free hydroxyl groups, these may be protected intermediarily also by etherification.

In an analogous manner other saturated and unsaturated 17.20-epoxy-pregnane-21-als are prepared, for example the Δ⁴-17.20-epoxy-pregnene-3-one-21-als.

By reduction of the 17.20-epoxy-compounds saturated and unsaturated pregnane-17-ol-21-als and subsequently their 17-derivatives may be obtained.

What we claim is:

1. The saturated and unsaturated pregnane-21-als containing in 20-position a member of the group consisting of an esterified and an etherified hydroxyl group.
2. The Δ⁴-pregnene-3-one-21-als containing in 20-position a member of the group consisting of an esterified and an etherified hydroxyl group.
3. The saturated and unsaturated pregnane-17-ol-21-als containing in 20-position a member of the group consisting of an esterified and an etherified hydroxyl group.
4. The Δ⁴-pregnene-3-one-17-ol-21-als containing in 20-position a member of the group consisting of an esterified and an etherified hydroxyl group.
5. The saturated and unsaturated pregnane-21-als containing in 17- and 20-position a member of the group consisting of an esterified and an etherified hydroxyl group.
6. The Δ⁴-pregnene-3-one-21-als containing in 17- and 20-position a member of the group consisting of an esterified and an etherified hydroxyl group.

KARL MIESCHER.
ALBERT WETTSTEIN.